United States Patent [19]

Parsi et al.

[11] Patent Number: 4,707,240
[45] Date of Patent: Nov. 17, 1987

[54] METHOD AND APPARATUS FOR IMPROVING THE LIFE OF AN ELECTRODE

[75] Inventors: Edgardo J. Parsi, Lexington; Keith J. Sims, Framingham; Arthur L. Goldstein, Weston, all of Mass.

[73] Assignee: Ionics Incorporated, Watertown, Mass.

[21] Appl. No.: 907,702

[22] Filed: Sep. 15, 1986

[51] Int. Cl.[4] .................. C25B 11/00; C25B 11/04; C25C 7/02; C25D 17/10
[52] U.S. Cl. ................. 204/290 F; 204/280; 204/290 R; 204/299 R; 204/301; 204/302; 210/321.72
[58] Field of Search ............... 204/280, 290 R, 290 F, 204/299 R, 301, 302; 210/321.1, 321.2

[56] References Cited

U.S. PATENT DOCUMENTS

| | | | |
|---|---|---|---|
| 3,453,201 | 1/1969 | Mihara et al. | 204/301 |
| 4,160,704 | 7/1979 | Kuo et al. | 204/128 |
| 4,292,159 | 9/1981 | Kuo et al. | 204/292 |
| 4,461,693 | 7/1984 | Jain | 204/301 |
| 4,569,739 | 2/1986 | Klinkowski | 204/180.1 |

Primary Examiner—Arthur P. Demers
Attorney, Agent, or Firm—Norman E. Saliba

[57] ABSTRACT

Method and apparatus are disclosed for improving the anodic life of an electrode in an electrodialysis stack which electrode comprises at least in part an area which is anodic during at least part of the duty time of said stack, which stack also comprises an electrode compartment (chamber, cell, space) containing said electrode, a counter-electrode in a counter-electrode compartment and interior compartments between said electrode compartment and said counter-electrode compartment, which method and apparatus comprises:

(a) introducing into said electrode compartment (and means therefor) a solution capable of forming a film on said area which is anodic during at least part of the operating time of said stack, which film is characterized by being electronically conducting and substantially refractory anodically, and (b) causing a film derived at least in part from said solution to be formed on said area which is anodic during at least part of the duty time of said stack (and means therefor) said film characterized by being substantially refractory anodically and electronically conducting.

21 Claims, 4 Drawing Figures

METHOD AND APPARATUS FOR IMPROVING THE LIFE OF AN ELECTRODE

BACKGROUND OF THE INVENTION

1. Field of the Invention

Electrodialysis ("ED") has become an accepted process and apparatus for transferring low molecular weight ions from one electrolytically conducting solution (variously referred to as the "demineralization", "diluting", "diluate", "donating", "donor", "demineralizing", "depleting" or "desalting" solution) to another (variously referred to as the "concentrating", "rceiving", "rinsing", "concentrate", "concentration", "donee", "brine" or "waste" solution). The state of the art is well described in pages 726 through 738, volume 8, Kirk-Othmer Encyclopedia of Chemical Technology, Third Edition, John Wiley and Sons, New York. Typically many, spaced, ionically-conducting, substantially hydraulically impermeable membranes are arrayed between a single pair of electrodes. The membranes are generally separated from each other by mass transport inducing structures forming electrolyte compartments (chambers, cells, spaces) therebetween. Such inter-membrane compartments are referred to herein as interior compartments, cells, chambers, or spaces. A group of interior compartments and their juxtaposed electrodes are often referred to as an electrodialysis pack. An electrodialysis stack comprises one or more such packs. The object of an ED apparatus is generally the processes taking place in the interior compartments (for example, demineralization, concentration or metathesis) induced by the passage of direct current (which may contain a substantial alternating current component) in series through the interior compartments and associated membranes. Such current is essentially ionic or electrolytic in nature, that is carried by electrically charged atoms or low molecular weight molecules passing through the interior compartments and membranes. Such charged atoms and molecules are called ions and if positively charged then cations and if negatively charged then anions.

The function of the electrodes is to convert such ionic or electrolytic current to and from the electronic current (i.e., current carried by negatively charged electrons and/or positively charged "holes") in conventional electricity distribution systems. Such conversion at a positively-charged electrode (called an anode) requires the donation of electrons by something to the electrode and/or, equivalently the acceptance by something of holes from the electrode). Such a conversion at a positively charged electrode is an oxidation process and in ED is typically the oxidation of water to oxygen gas ($O_2$) and hydrogen ions ($H^+$, often represented as $H_3O^+$ and referred to as hydronium ions) and/or the oxidation of chloride ($Cl^-$) to chlorine gas ($Cl_2$) and/or hypochlorous acid (HOCl) and hydrogen ions. A substantial potential difference is required across the interface between the electrode and any ambient solution in order to generate such oxygen, chlorine and/or hypochlorous acid, such potential difference being sufficient in principle to oxidize many otherwise appropriate electrode materials. For example copper, iron, tin, zinc, aluminum and steel are generally rapidly oxidized (corroded) to soluble salts or ions or to insoluble oxides and hydroxides. Such corrosion can often be substantially quantitative that is, the conversion from ionic to electronic current involving principally oxidation of the electrode material itself rather than oxidation of water to oxygen or chloride to chlorine and/or hypochlorous acid. The conversion from ionic to electronic current is generally referred to as electrolysis and the materials formed by such conversion (for example, oxygen, chlorine or oxidation products of the electrode material itself) as electrolysis products or products of electrolysis. Because of such electrolysis products, electrodes are typically positioned in compartments (commonly referred to as electrode compartments, cells, chambers or spaces or as anolyte or anode compartments etc. if the electrode has always a positive polarity or as catholyte or cathode compartments etc. if the electrode has always a negative polarity), means being provided in said compartments to permit the electrodes to be flushed with appropriate electrolyte solutions to carry away the products of electrolysis. The composition of such flushing solution may often have a profound effect on the corrosion of the electrode material. For example nickel or nickel-plated steel is almost totally inert as an anode in solutions of alkali hydroxides but is rapidly corroded in chloride solutions.

Conversion from ionic to electronic current at a negatively-charged electrode (called a cathode) requires the acceptance of electrons from the electrode by something (and/or equivalently the donation by something of holes to the electrode). Such a conversion is a reduction process and in ED is typically the reduction of water to hydrogen gas ($H_2$) and hydroxide ions ($OH^-$, sometimes called hydroxyl ions). As mentioned above, cathodes are also generally positioned in compartments, means being provided to permit flushing with appropriate electrolyte solutions to carry away the products of electrolysis. The selection of materials for cathode is generally less difficult than for anodes and many materials are satisfactory for ED use including graphite, austenitic stainless steels (e.g., the various types 316), Incoloy 825, Hastelloy C-276, Inconel 600, titanium, niobium or zirconium depending to a certain extent on the composition of the liquid used to flush the cathode. For example chemically pure titanium may be corroded as a cathode in acid solutions. If it is necessary or desirable to utilize an acidic catholyte flush (for example to avoid precipitation of alkali insoluble substances such as calcium carbonate and magnesium hydroxide which may be formed from the hydroxide ion electrolysis product and any calcium bicarbonate or magnesium salt in the cathode flush) then Grade VII titanium or Ti Code 12 (trade name of Titanium Metal Corporation of America) will be preferred to chemically pure Ti.

ED is successfully applied in a monotonic mode in which one of the electrodes in an ED pack has always a positive polarity and the counterelectrode always a negtive polarity. In demineralization/concentration duty any specified interior compartment then always has the same function, e.g., every other interior compartment is a demineralizing compartment and the intervening interior compartments are concentrating compartments. Applications include the recovery of sodium chloride from seawater on a large scale and the demineralization of cheese whey. However, during the demineralization of surface brackish waters and some other solutions (e.g. tertiary sewage effluents) precipitates of sparingly soluble minerals (such as calcium, strontium and barium sulfate or calcium carbonate) may occur on or in some of the surfaces of some of the membranes. Further colloid materials and medium molecular weight ions (e.g., humate and fulvate anions, branched chain alkyl benzene sulfonates, polyphosphates) if present in the solution electrodialyzed may also accumulate at or in some of the surfaces of some of the membranes. Although such sparingly soluble minerals, colloid materials and medium molecular weight ions may be removed by auxiliary processes prior to ED (e.g., by water-softening, coagulation, filtration, absorption on activated carbon and the like) such processes add both cost and complexity to an ED plant. It is generally preferable to use ED in a reversing (ditonal) mode (see for example U.S. Pat. No. 2,863,813) in which the direction of passage of the direct electric current is reversed from time to time. It is found that such reversing ED (called "EDR") serves generally to remove from the membrane surfaces the sparingly soluble minerals, colloid materials, medium molecular weight ions and the like. Sub-modes of EDR are distinguishable. For example the reversal may be substantially asymmetric, e.g., the current may pass in one direction for about 14 minutes and in the opposite direction for about 1 minute. The reversal may instead be substantially symmetric e.g., passing in one direction for about 15 minutes (first half cycle) and in the opposite direction for about the same length of time (second half-cycle), the whole cycle being repeated continuously and indefinitely. Short cycle reversal (whether symmetric or unsymmetric) generally means cycle times of several minutes to a few hours whereas long cycle reversal generally signifies cycle times of several hours to several days. (Symmetric reversal has been reported in which the direction of current was changed every 7 days; asymmetric reversal in which the current was in one direction for about 148 hours and in the other for about 20 hours). It will be clear to those skilled in the art that in the case of ED operating in demineralization/concentration duty the functions of the interior ED compartments in a stack interchange when the direction of current changes, i.e., demineralization compartments become concentrating compartments and vice versa (see U.S. Pat. No. 2,863,813 cited above). For symmetric reversal and long cycle asymmetric reversal it is customary to interchange the hydraulic conduits manifolded to such groups of compartments so that the apparent flows of demineralizate and concentrate in such conduits outside the battery limits do not change (except for a brief period immediately following reversal). If minerals sparingly soluble at high pH's (such as calcium carbonate and magnesium hydroxide) are formed at a negative polarity electrode during ED then current reversal will often facilitate dissolution of dislogment (apparently from the H+ ions formed when the electrode has a positive polarity). In such case reversal can result in an ED process requiring no chemicals for removal of deposits from any surfaces, a feat unique among saline water desalting processes, making EDR a very convenient, desirable process.

In the case of monotonic ED, Hastelloy C-276 and austenitic stainless steels are generally convenient for cathodes and platinum (Pt) plated titanium (Ti) or niobium (Nb) for anodes.

In the case of EDR, each electrode in an ED stack will have positive polarity at least part of the stack operating time (duty cycle, working time). Except in the case of highly asymmetric EDR it is generally no longer satisfactory then to use Hastelloy C-276, austenitic stainless steels and the like as one of the stack electrodes and generally both electrodes are valve metals (typically titanium or niobium, the latter often referred to in the trade as columbium) thermally and/or electroplated with Pt.

An objective of this invention to provide processes and apparatuses for extending the useful anode life of electrodes in ED stacks whether operating in a monotonic or reversal mode.

This objective and others will become clear from the following description, drawings, examples and claims.

2. Description of the Prior Art

U.S. Pat. No. 3,453,201 (Mihara et. al.) discloses the use of a composite, reversing electrode at each end of an ED stack in long cycle reversal, wherein each composite electrode consists of interdigitated cathode and anode portions electrically disconnected and insulated from each other. The anode and cathode portions are chemically pure titanium or tantalum, the anode portions being platinum coated. Switching means energize, for example, the platinum coated anode portion of the first composite electrode and the cathode portion of the second composite electrode, the remaining portions of each composite electrode being contemporaneously disconnected and de-energized. During polarity reversal the anode portion of the first composite electrode is de-energized and disconnected, the cathode portion (not platinum coated) thereof is energized, the anode portion (platinum coated) of the second composite electrode is energized and the cathode portion of the latter is de-energized and disconnected. Thus each electrode portion, although not always maintained as an anode or as a cathode, is nevertheless never changed in its working polarity. A serious disadvantage of such a polarity reversing composite electrode system is that the disconnected and de-energized anode portion of each composite electrode is in fact exposed to a powerfully reducing environment when its adjacent cathode portion is working as a cathode, leading to reduction of the oxide and/or hydroxide protective layer on the platinum coating and loss of platinum as described above. Such interdigitated composite electrode systems do not substantially improve the useful life of the anode portions of each composite electrode at any given reversal cycle time, i.e., they do not substantially decrease loss of noble metal coating per ampere-hour as compared to systems wherein a single polarity reversing electrode of the same area is positioned in each electrode compartment.

U.S. Pat. No. 4,461,693 (Jain) discloses interdigitated composite electrodes in which the anode portions coated with noble metals and/or noble-metal-oxides are kept anodically polarized at all times without exceptions (whether or not working as anodes) at potentials sufficient to maintain the state of oxidation of the coatings. The direct-current power supply is necessarily more complicated and expensive than that ordinarily used in EDR or even that required for the Mihara composite electrodes. Jain also discloses noble-metal coated valve metal electrodes wherein the coating covers substantially less than the total working surface area of the membrane separating the electrode compartment from the interior compartments of the ED stack. Since it appears as mentioned above that a substantial fraction of the surface atoms are lost from the noble metal coatings as a direct result of current reversal, decreasing the fraction of the electrode which is anodically active apparently leads to an almost proportional decrease in loss of noble metal per ampere hour. Such fraction may not approach zero however and substantial loss of noble metal is still experienced in EDR, particularly short-cycle EDR.

U.S. Pat. Nos. 4,160,704 and 4,292,159 (Kuo et. al.) disclose a method and apparatus for in-situ reduction of the cathode over-voltage for hydrogen gas evolution in concentrated caustic at high temperatures in monotonically operated (i.e. non-reversing) membrane or diaphragm chloralkali electrolytic cells by introducing into the hot, concentrated caustic, ions of metals which have a low over-voltage for hydrogen gas evolution under such conditions. There is no disclosure concerning extending the life of the anodes in such processes and apparatuses.

DESCRIPTION OF PREFERRED EMBODIMENTS

In its broadest aspect, the present invention comprises methods and apparatuses for extending the anodic life of an electrode in an ED stack which electrode comprises at least in part an area which is anodic during at least part of the working time (duty cycle) of said stack, which stack also comprises an electrode compartment (chamber, cell, space) containing said electrode, a counter-electrode in a counter-electrode compartment and interior compartments between said electrode compartment and said counterelectrode compartment, which methods and apparatuses comprise:

(a) introducing into said electrode compartment (and means therefor) a solution capable of forming a film on said area which is anodic during at least part of the working time of said stack, which film is characterized by being electronically conducting and substantially refractory anodically, and (b) causing a film derived at least in part from said solution to be formed on said area which is anodic during at least part of the working time of said stack (and means therefor), said film characterized by being substantially refractory anodically and electronically conducting under the conditions of use as an anode.

Figure 1:
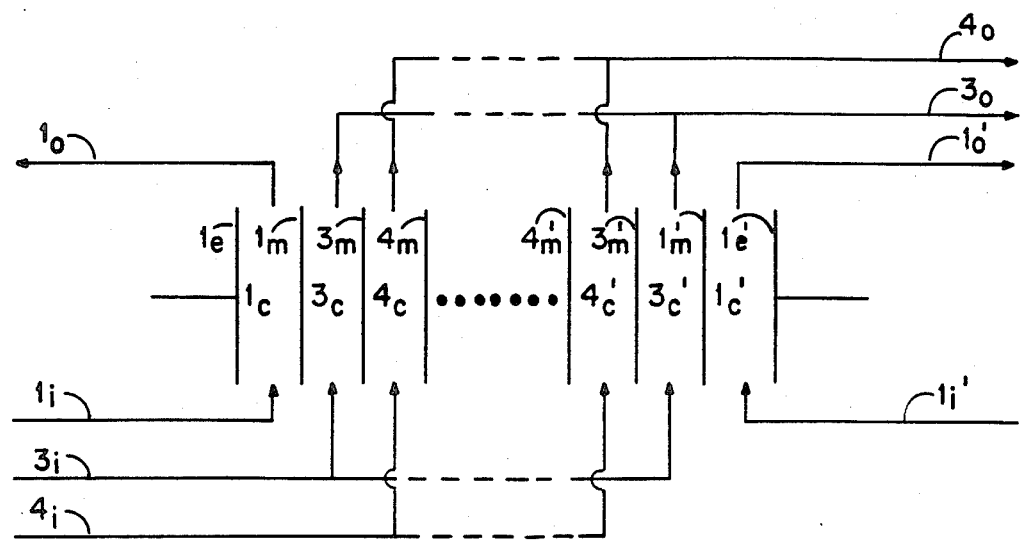
FIG. 1 is a schematic representation of the ED process and apparatus known in the prior art.

Referring to FIG. 1, there is indicated a schematic representation of the ED process and apparatus known in the prior art comprising an electrode $1e$ positioned in an electrode compartment (cell, chamber, space) $1c$, a counter-electrode $1e'$ positioned in a counter-electrode compartment $1c'$, interior compartments $3c, 4c \ldots 4c'$, $3c'$ separated from electrode compartment $1c$ and counter-electrode compartment $1c'$ by membranes or diaphragms $1m$ and $1m'$ respectively. The interior compartments are separated from each other by membranes or diaphragms $3m, 4m \ldots 4m', 3m'$. The process and apparatus also includes means for removing the products of electrolysis at electrode $1e$ comprising inlet means $1i$ for introducing a rinsing or flushing electrolyte solution into compartment $1c$ and outlet means $1o$ for removing said flushing solution and electrolysis products from said compartment. Similar means $1i'$ and $1o'$ are provided for removing the products of electrolysis at counter-electrode $1e'$ from counter-electrode compartment $1c'$. The characteristics of the membranes or diaphragms $1m$ and $1m'$ are selected after consideration of the composition of the solutions in compartments $1c$ and $3c$ on the one hand and $3c'$ and $1c'$ on the other. In the case of an ED apparatus operating in a reversing mode, barriers $1m$ and $1m'$ generally (but not necessarily) have quite similar if not identical characteristics and compositions. For example, if the apparatus and process represented by FIG. 1 is configured for demineralization/concentration duty then for example, the barriers $1m$ and $1m'$ may both be anion-selective membranes well-known in the art. In such case the membranes $3m$, $5m$ (not shown) ... $5m'$ (not shown) and $3m'$ will generally be cation-selective membranes also well-known in the art and the membranes, $4m, 6m$ (not shown) ... $6m'$ (not shown) and $4m'$ anion-selective membranes. Such alternation of membrane characteristics leads to two classes of interior compartment: $3c, 5c$ (not shown) ... $5c'$ (not shown), $3c'$; and $4c, 6c,$ (not shown) ... $6c'$ (not shown), $4c'$. In demineralization/concentration duty one such class will be demineralization compartments and the other concentration compartments depending upon the polarity of the electrodes. Inlet means $3i$ and outlet means $3o$ manifold with compartments of the class $3c \ldots 3c'$ and inlet and outlet means $4i$ and $4o$ respectively manifold with compartments of the class $4c \ldots 4c'$.

In demineralization/concentration duty on saline water, electrode compartments $1c$ and $1c'$ are generally flushed with part of the saline water being processed to remove products of electrolysis, the effluents therefrom (through means $1o$ and $1o'$) being sent to waste or if it is desirable to conserve saline water (the usual case) sent after gas disengagement to one or both of the inlet means $3a$ and $4i$ to the interior compartments of the apparatus. Electrode compartments are sometimes flushed with concentrate from the interior compartments which is then sent to waste.

(Herein below "electrode" and "electrode-compartment" are used to signify the ionic-to-electronic current conversion means on which attention is being focused and respectively the compartment in which such means is positioned while "counter-electrode" and "counter-electrode-compartment" signify the necessary companion conversion means and compartment containing such on which attention is not being focused at the time).

Figure 2:
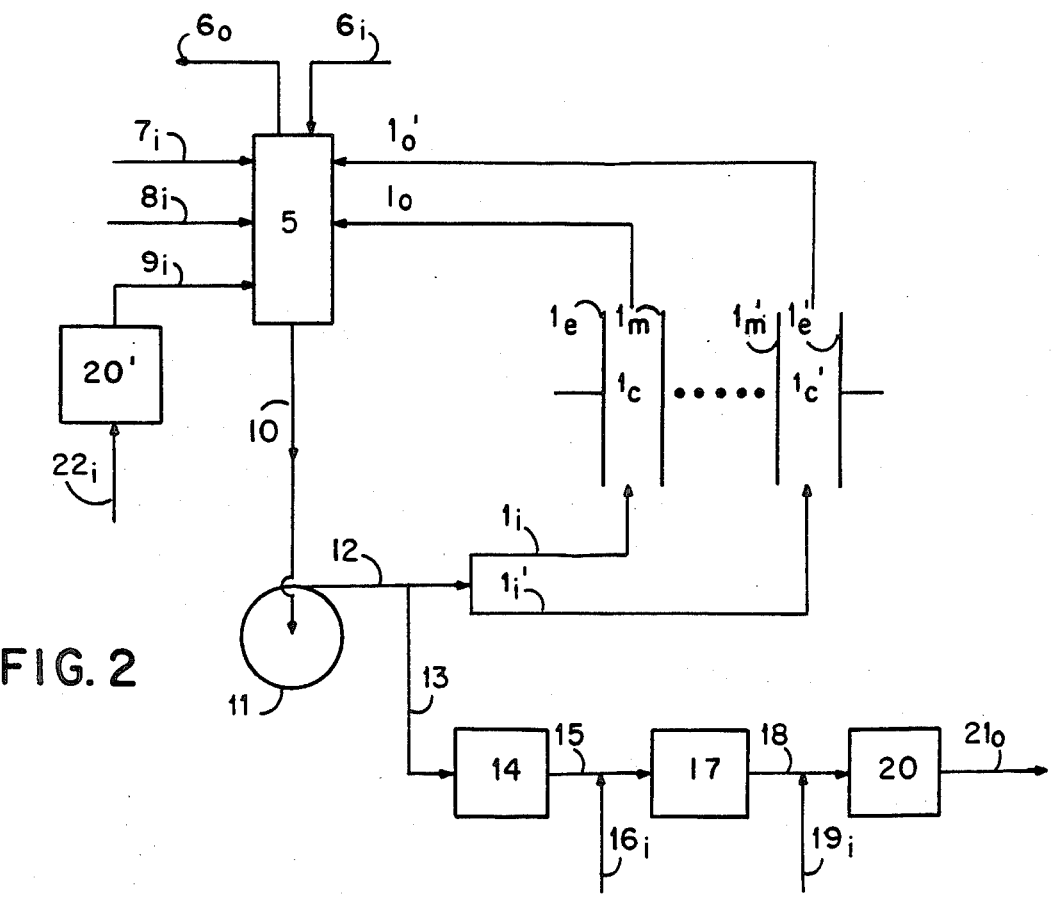
FIG. 2 is a schematic representation of one preferred ED process and apparatus according to the present invention.

Referring to FIG. 2, it has now been found unexpectedly that the anodic life in an ED stack of an electrode comprising an anodically refractory electronic conductor (such as platinum but not limited thereto as will be further shown) may be expected by introducing into the electrode compartment in said stack containing said electrode, a solution capable of forming a film on that area of the electrode which is anodic during at least part of the working time of said stack, which film is characterized by being electronically conducting and substantially refractory anodically and causing a film derived at least in part from said solution to be formed on said area, said film being substantially refractory anodically and electronically conducting under the conditions of use of the area as an anode. "Anodically refractory" as used herein signifies that under the conditions of use as an anode, only an insubstantial fraction of the anode current (less than 10 percent, preferably 1 percent or less) results in loss of the electronic conductor, the remainder of the current producing an electrolysis products derived entirely from the environment surrounding said conductor. In a preferred method, such film forming solution is prepared by conserving the products of corrosion of that area of the electrode (and/or of its companion counter-electrode or of other electrodes in the ED apparatus) which is anodic during at least part of the working time of the ED stack.

The process and apparatus of FIG. 2 comprises in addition to the components of like number identified in connection with FIG. 1, a gas-liquid separator-reservoir 5 into which electrode compartment outlets 1$o$ and 1$o'$ empty. Since the products of electrolysis at a negative polarity electrode include hydrogen gas, the head space in separator-reservoir 5 is preferably flushed with 100 volumes of air or more per volume of hydrogen gas through air inlet means 6$i$ and outlet means 6$o$ to dilute the hydrogen well below the explosion limit for hydrogen-air mixtures. The de-gasified liquid from separator-reservoir 5 and conduit 10 is repressurized by pump 11 and redistributed by conduits 12, 1$a$ and 1$i'$ to electrode compartments 1$c$ and 1$c'$. (The interior compartments of the ED stack shown in FIG. 1 are not shown in FIG. 2 but are understood to be there). Measures are taken as much as are practical to conserve this closed system electrode loop as will be more fully discussed below. It is found quite unexpectedly that in such a closed loop the anodically refractory materials lost from those portions of the electrodes in anode service are apparently substantially redeposited on those portions of the electrodes which are in cathode service. Thus in the reversing mode a dynamic process will exist in which that anodically refractory material lost from an electrode in an anode half-cycle is apparently substantially regained in ensuing cathode half-cycles, part of such regain no doubt deriving from material lost from the companion (counter-) electrode or other electrodes in the apparatus. The useful anodic life of the electrodes is thereby dramatically extended.

Such recoating of the anodically refractory materials is completely unexpected particularly in view of the strict recipes in the literature with respect to cleaning and other pretreatments of substrates intended for deposition of anodically refractory conductors (such as, without limitation, the noble metals, their alloys and oxides) and with respect to the composition of solutions used for such deposition and the conditions under which the depositions are carried out. Although a theory to explain this unexpected behavior is not apparent, it appears that such dynamic equilibrium may exist if the efficiency for re-deposition no matter how low is nevertheless equal to or greater than the "efficiency" for anodic corrosion. For example, a corrosion rate of 0.3 milligrams of platinum per ampere-hour in a 4 electron process represents a corrosion efficiency of 0.017 percent. (Such corrosion rate is nevertheless generally uneconomic.)

We have also found platinum (and as will be more fully disclosed below, other anodically refractory conductors) inevitably lost from the closed-loop electrode system through leaks, spills, necessary blow-down or in other ways may be compensated for by adding an appropriate amount of platinum salt (or other appropriate material) to the closed loop, for example, through inlet means 9$i$. Such supplemental anodically refractory material may be added continuously or intermittently at any appropriate point in the electrode loops. It may be added as a solution, dispersion or sol directly, by corrosion of supplemental anodes, by desorption from an ion-exchanger or other sorbing material and in other ways within the purview of those skilled in the art.

Depending upon the characteristics of the membranes 1$m$ and 1$m'$ and the compositions of the solutions processed in the interior compartments, sparingly soluble substances such as the calcium, strontium, and barium salts of bicarbonate, sulfate and phosphate may build up in the electrode loop. Some of these may be controlled by addition of acid, for example, through inlet means 8$i$. Others may be controlled by regularly or periodically bleeding (blowing-down) some of the solution in the loop, for example, through outlet 13. If the anodically refractory material is valuable (e.g., platinum) or environmentally undesirable (e.g. lead) it may be recovered, for example, by passing the bleed (blowdown) through a volume of activated carbon in container 14 to absorb and/or decompose oxidizing agents scuh as chlorine or hypochlorous acid, optionally adding a reducing agent such as sodium sulfite through inlet means 16$i$ to the effluent in conduit means 15 from container 14. The blow-down, substantially free of oxidizing agents, may then optionally be contacted in whole or in part with a volume of weakly or strongly basic anion exchange resin in the base form in container 17 to alkalize the blow-down if necessary. Alternatively or additionally alkali may be added through inlet means 19$i$ to the blow-down in conduit 18. The resulting blow-down may then be contacted with a volume of chelating cation exchange resin in the alkali metal cation form in container 20 to absorb the dissolved or dispersed anodically refractory material. The thus depleted blow-down may then be sent to waste through outlet 21$o$. It may also be necessary to add water to the electrode recirculation system through inlet means 7$i$ to make up for losses through water electrolysis, electroosmosis transfer of water through the membranes adjacent to the electrodes, and by water evaporation or entrainment associated with the electrode gases or other gases exiting the reservoir 5.

Suitable chelating cation exchange resins include: Amberlite IRC-718 (Rohm and Haas Company, Philadelphia, Pa., U.S.A.), Lewatit OC 1048 (Bayer A.G., Leverkusen, B. R. D.), Duolite ES467 (Rohm and Haas Company), and Diaion CR-10. (Mitsubishi Chemical Industries Ltd., Tokyo, Japan). These are all sensitive to available chlorine and other powerful oxidizing agents and present maximum absorption capacity at pH's in excess of 9. They exhibit very strong absorption for di- and multi-valent cations such as Pt, Pb, Ni, Co and Mn. The loaded chelating cation exchange resin may be regenerated with dilute acid. For example, container 20 may be moved to position 20' and acid passed into it through inlet means 22$i$, the effluent containing anodically refractory material passing through conduit 9$i$ into separator-reservoir 5. The chelating cation exchange resin may then be converted to the alkali metal ion form with an appropriate alkali (not shown), according to the various suppliers' instructions well-known in the art, and re-used.

Although FIG. 2 has been described and discussed with particular reference to platinum as the anodically refractory conductor it will be clear to those skilled in the art that appropriate modifications may be made with respect to conservation of platinum and other refractory conductors such as without limitation other noble metals and their oxides, nickel, lead, molybdenum, vanadium and tungsten and codeposits and mixtures thereof. For example, platinum may be redeposited by filling an electrode compartment with an appropriate platinum electroless plating solution well known in the art, the electrode preferably still having on the surface residual noble metal or oxide to act as a catalyst. Platinum and other anodically refractory conductors may be deposited from sols, for example, as prepared in accordance with the teaching of British Pat. No. 976,328.

Figure 3:
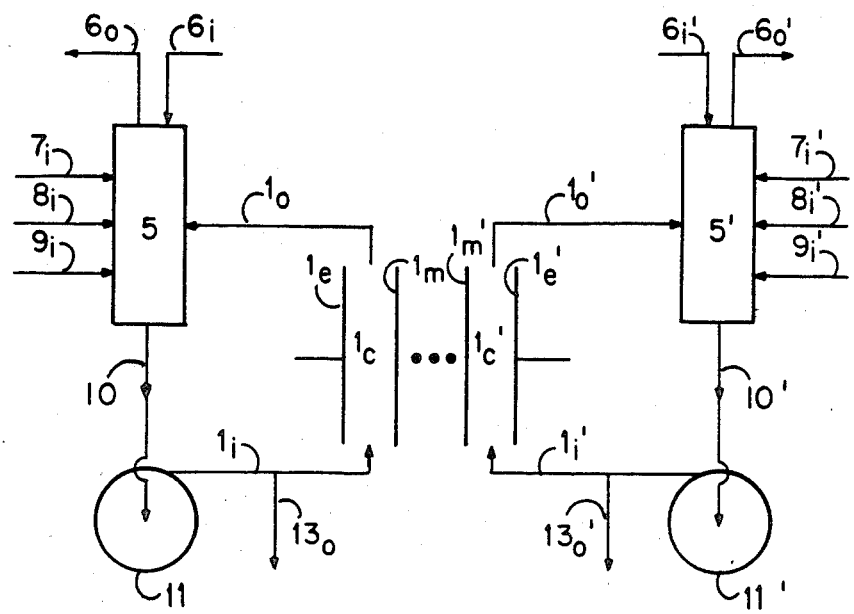
FIG. 3 is a schematic representation of another or second preferred ED process and apparatus according to the present invention.

Referring to FIG. 3 there is illustrated in schematic representation a second preferred method and apparatus for carrying out the present invention. A second gas-liquid separator/reservoir 5' and a second repressurizing means 11' have been added, providing two independent electrode loops. The electrodes 1e and 1e' may then have the same or different compositions and the flushing liquids in electrode compartments 1c and 1c' may be the same or different. For example, one or both of the electrodes 1e and 1e' may be nickel or nickel electrically or chemically plated on steel in which case the flushing liquid in the respective electrode compartment (1c and/or 1c') is preferably a dilute alkali metal hydroxide substantially free of halide ions but optionally containing for example alkali metal sulfates. Under such circumstances nickel is refractory anodically. The corrosion products from such a nickel electrode in the anode mode will be accumulated (except for inevitable losses as mentioned above) in the respective gas/liquid separator/reservoir and redeposited on the electrode when the latter is subsequently made cathodic. Losses may be made up for example by adding additional alkali metal hydroxide (and optionally sulfate) through an appropriate inlet means such as 8i and/or 8i' and nickel salts (e.g., nickel sulfate) through appropriate inlet means such as 9i and 9i'.

When nickel is used as the anodically refractory, electronic conductor and alkali metal hydroxide solution (with or without e.g. alkali metal sulfate) as the respective electrode compartment flushing liquid, then it is advantageous to use as the respective electrode compartment membrane, a perfluoro cation selective membrane having a high Hittorf transport number for alkali metal cations in hydroxide solutions.

The apparatus and process represented in FIG. 3 has the advantage that the gaseous products of electrolysis (e.g., oxygen and hydrogen) are kept separate, avoiding explosive mixtures thereof and the need for dilution with large volumes of air. When an electrode is in the cathode mode, the hydrogen electrolysis product may be allowed to disperse into the atmosphere through a flame arrestor (not shown) in the respective outlet 6o or 6o' without dilution with air. Such method of operation avoids absorption of carbon dioxides from the dilution air into the recirculating alkaline solution. Preferably the respective separator/reservoir 5 or 5' is flushed briefly with nitrogen (or other inert) gas at the beginning and end of a cathode half cycle to avoid mixing of hydrogen gas with oxygen gas from an anode half cycle.

Referring again to FIG. 3, one or both of the electrodes 1e and 1e' may be lead or a lead alloy or an electron conductor substrate such as steel or titanium and the like clad or plated with lead or a lead alloy. In such case the electrode flushing solution should be dilute sulfuric acid which may contain a substantial amount of alkali metal sulfate. Preferred as lead alloys are those containing a few percent (e.g. about 2 percent) of silver with or without other alloying agents, such alloys being particularly tolerant of small amounts of chloride ion. Lead-platinum or lead alloy-platinum bielectrodes may also be used as well known in the art (see for example, "The Lead-Platinum Bielectrode" L. L. Sheir in "The Electrochemistry of Lead", ed. A. T. Kuhn, Academic Press, N.Y., 1979 page 257 et seq.). It is advantageous with such acidic electrode flushing solutions to use as membranes, anion-selective membranes having low transport numbers for hydrogen ions in acidic solutions.

It will be clear to those skilled in the art that the apparatus and process represented in FIG. 3 may for example consist of one electrode loop using a lead-alloy electrode (or the like) and an acidic sulfate electrode flush and as the second electrode loop, a nickel plated electrode (or the like) and an alkaline sulfate electrode flush.

Figure 4:
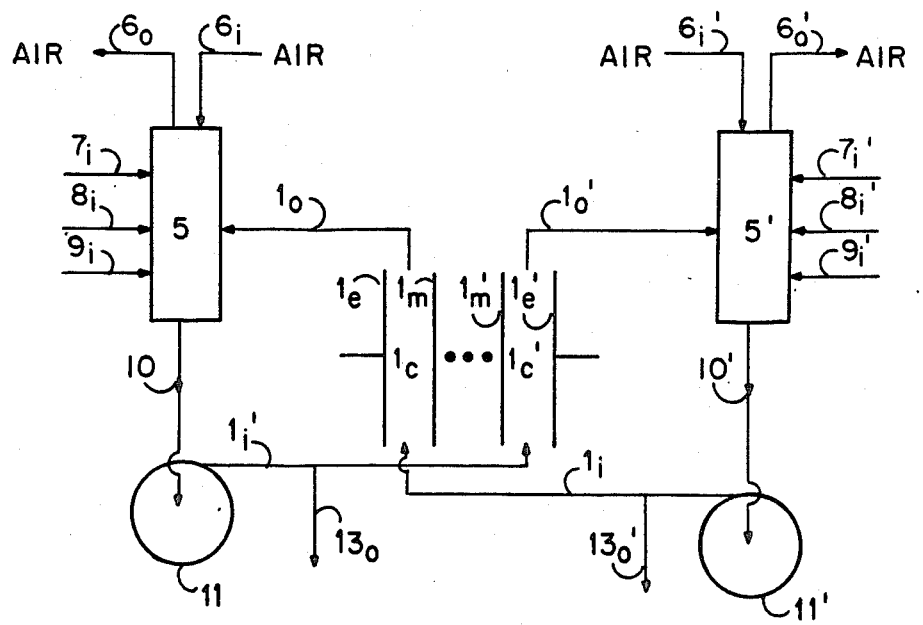
FIG. 4 is a schematic representation of a third preferred ED process and apparatus according to the present invention.

Referring to FIG. 4 there is illustrated in schematic representation a third preferred method and apparatus for carrying out the present invention. Compared to FIG. 2, a second gas-liquid separator/reservoir 5' and a second repressurizing means 11' have been added but the resulting electrode loops are in series. The electrodes 1e and 1e' will then generally have similar compositions e.g. platinum on valve metal substrates though they may differ in detail e.g. one may be solid nickel, the other nickel plated steel. The electrode flushing solutions will necessarily be substantially the same, differing only in dynamic details owing to the electrolysis taking place at the electrodes. The gaseous electrolysis products are again kept separate. The process and apparatus represented in FIG. 4 are particularly adapted to symmetrical reversal.

EXAMPLE 1

A 100 cell pair electrodialysis stack is used on a batch basis for the deashing of concentrated sweet whey by about 90 percent. Periodic, symmetric electrical reversal is not used. The anode is niobium having about 2.5 milligrams of thermally reduced platinum per sq. cm. The cathode (counter-electrode) is Hastelloy C. A platinum wire about 0.2 mm in diameter is inserted from the outside of the stack through the gasket area of the concentrating (brine) compartment nearest the anode. A d.c. voltmeter is connected between the anode electrical lead and the platinum wire. The anolyte contains about 0.05 grams per liter sulfuric acid. When the anode is new the voltage between the platinum wire and the anode lead is less than about 5 volts. After about 3000 operating hours the voltage reading increases rapidly to more than 15 volts, an indication that the anode has reached the end of its useful life.

The electrodialysis stack including the electrode compartments is rinsed with water. A solution containing about 5 grams/liter sodium sulfate is circulated through the ED stack including the counter-electrode compartment. A solution of DNS platinum containing about 5 grams Pt per liter is recirculated through the niobium electrode compartment. The niobium is made cathodic and the counter-electrode anodic. A current of about 15 ma/cm$^2$ is passed for about 15 minutes. The remaining DNS Pt solution is carefully collected and the ED stack rinsed with water. It is found that in ED operation on concentrated whey the voltage between the anode electrical lead and the Pt wire is again less than 5 volts.

EXAMPLE 2

The ED stack of Example 1 having a substantially restored niobium anode is used for the deashing of concentrated whey until the voltage reading between the anode lead and the Pt wire reaches about 10 volts. The entire stack is rinsed with water and an electroless-nickel solution according to U.S. Pat. No. 4,061,802 is recirculated through the niobium electrode compartment for about 2 hours. The apparatus is thoroughly rinsed with water. It is found that in ED operation on concentrated whey the voltage between the anode lead and the Pt wire is again less than about 5 volts.

EXAMPLE 3

Part I: A 150 cell pair electrodialysis stack is used in a straight-through continuous mode to demineralize by about 45 percent a brackish water having approximately the following composition (mg/l):

$Na^+$: 360
$Ca^{++}$: 112
$Mg^{++}$: 27
$Cl^-$: 515
$SO_4^=$: 335
$HCO_3^-$: 104
$SiO_2$: 45
pH: 7.2

The electrodes are Ti Code 12 (a registered trademark of Titanium Metal Corporation of America; the alloy has about 0.8 percent nickel and 0.3 percent molybdenum) electroplated with about 2.2 milligrams of platinum per $cm^2$ from a sodium platinate bath. The electrode compartments are separated from interior compartments by AR103PZL389 anion selective membranes available from Ionics, Incorporated, Watertown, Mass., U.S.A. The electrodes are rinsed in parallel with feed water. The effluents from the electrode compartments are sent to a common gas-liquid separator, the gas space of which is flushed with about 100 volumes of air per volume of combined electrode gases. The effluent liquid from the gas-liquid separator is combined with the feed to the interior demineralizing and concentrating compartments of the ED stack. The stack is operated in a symmetric reversal mode, the direction of electric current (average about 9.8 $ma/cm^2$) being reversed about every 20 minutes at which time the diluting and concentrating compartments are also interchanged. From time to time when each electrode is in anode mode the d.c. voltage between the electrode and the compartment adjacent to the electrode compartment is measured. When the electrodes are new the thus measured voltage is less than about 5. After several thousand hours the voltage increases to about 10, the maximum considered safe to avoid corrosion of the titanium alloy subtrate.

Part II: The stack is reassembled with new electrodes of substantially the same composition. The electrode compartment flows are substantially as described in connection with FIG. 2, namely the effluents from the electrode compartments pass to gas-liquid separator 5. The pH therein is adjusted with hydrochioric acid to maintain a Langelier Index of not greater than about +2 in the effluent from an electrode compartment in which the electrode is operating in cathode mode. Softened feed water is added from time to time to maintain the liquid level in gas-liquid separator-reservoir 5. As required, part of the recirculating electrode stream is blown-down from time to time through blow-down means 13 to maintain the electrical conductivity in gas-liquid separator 5 below about 10,000 microsiemens/cm. The blow-down passes through activated carbon 14 to remove active chlorine and sodium sulfite solution is added through means 16i to reduce active chlorine to less than 0.1 ppm. The pH is adjusted to a minimum of about 9 with sodium hydroxide solution through means 19i and the resulting alkaline, substantially chlorine free blow-down passed through a column 20 of Amberlite IRC-718 chelating cation-exchange resin in the sodium form (available from Rohm and Haas Company, Philadelphia, Pa., U.S.A.) according to the supplier's instructions well-known in the art. The stack is operated in the approximately 20 minute half-cycle symmetric reversing mode as described above on the brackish water also described above, again at an average current density of about 9.8 $ma/cm^2$. The effluent from the IRC-718 column is monitored from time-to-time for Pt and when break-through is detected the Pt saturated column is replaced with a fresh column 20 in the sodium form. The Pt saturated column is connected as column 20' to influent means 9i, hydrochloric acid feed through means 8i is temporarily suspended and about 7 percent hydrochloric acid is metered through the column 20' as required to maintain the pH in gas-liquid separator 5, until approximately 2 liters of acid have passed through the column for each liter of IRC-718. The column is then rinsed with soft water into gas-liquid separator 5 and the controlled flow of acid through means 8i resumed. The column 20' of IRC-718 is removed from means 9i and returned to the sodium form with approximately 7 percent sodium hydroxide solution, all of the above in accordance with the supplier's instructions well-known in the art.

It is found that the voltage in the anode mode between the electrode connection and the compartment adjacent to the electrode compartment remains below 10 for substantially longer than was experienced in Part I of this example.

Part III: When the above mentioned voltage first reaches about 10 on either of the electrodes in the ED stack, a solution of about 2.7 milligrams of chloroplatinic acid hexahydrate per $cm^2$ of active area of that electrode is injected directly into the inlet means to said high voltage electrode at the beginning of a cathodic half-cycle at a rate of about 0.2 milligrams per $cm^2$ per minute. The procedure is repeated again on another cathodic half-cycle and then on two cathodic half-cycles on the other electrode in the stack. It is found that the electrode voltage in the anode mode is again less than about 5 measured as described above and continues below 10 for a substantial fraction of the useful life determined in Part I of this example. When the electrode voltage in the anode mode again reaches about 10 on either of the electrodes the restoring procedure is again repeated except a solution containing about 1.8 milligrams of sodium hexa hydroxy platinate per $cm^2$ of active area of each respective electrode is used in each cathode-half cycle instead of about 2.7 milligrams of chloroplatinic acid hexahydrate.

Part IV: The AR103PZL389 anion-selective membranes are replaced with anion-selective membranes which have a low transport number for hydrogen cations in acid solutions. It is found that compared with the operations of Parts II and III of this example that less acid feed to gas-liquid separator 5 is required to maintain the above mentioned Langelier Index.

EXAMPLE 4

A 100 cell pair ED stack is used on a batch basis for the deashing by about 90 percent of concentrated sweet whey. Both electrodes are niobium having about 2.5 milligrams of thermally reduced platinum per sq. cm. The electrode compartments are separated from interior compartments by AR103PZL389 anion-selective membranes. The electrode compartment flows are substantially as described in connection with FIG. 2, namely the effluents from the electrode compartments pass to gas-liquid separator 5. The pH therein is adjusted with sulfuric acid to about 3. Demineralized water is added from time to time via inlet 7i to maintain the liquid level in gas-liquid separator 5. As required, part of the recirculating electrode stream is blown-down from time to time through blow-down means 13 to maintain the electrical conductivity below about 10,000 micro-siemens/cm and to prevent scaling by calcium salts. The batch size is selected to give about a six-hour batch time. The feed to the electrode compartments contains about 0.05 grams per liter sulfuric acid. Platinum wires are inserted from the outside of the stack through the gasket areas of the compartments adjacent to the electrodes. At the end of each batch the interior compartments of the stack are sanitized, the hydraulic connections to the deashing and concentrate compartments interchanged and the polarity of the electrodes inter-changed. The voltage between an electrode in anode mode and the adjacent platinum wire is measured from time to time. It is found that when the electrodes are new, such voltage is less than about 5. It is also found that the operating time to reach about 15 volts to substantially longer per electrode than that found in Example 1.

It will be apparent to those skilled in the art that numerous changes and modifications may be made in the preferred embodiments of the invention described above without departing from the scope of the invention. Accordingly, the whole of the foregoing description is to be construed in an illustrative and not in a limitative sense, the scope of the invention being defined solely by the appended claims.

What is claimed:

1. A method for extending the useful anode life of an electrode in an electrodialysis stack which electrode comprises at least in part an area which is anodic during at least part of the operating time of said stack, which stack also comprises an electrode compartment containing said electrode, a counter-electrode in a counter-electrode compartment and interior compartments between said electrode compartment and said counter-electrode compartment, which method comprises:
   (a) introducing into said electrode compartment a solution capable of forming an electronically conducting layer which is substantially refractory anodically on said area which is anodic during at least part of the operating time of said stack, and
   (b) causing an electronically conducting, substantially anodically-refractory layer to be formed on said area which is anodic during at least part of the operating time of said stack, said layer being derived at least in part from said solution.

2. The method according to claim 1 wherein during the operating time of said stack, the electrical polarity of said electrode and counter electrode is reversed at periodic intervals.

3. The method according to claim 2 wherein said periodic reversal is made in a symmetrical mode.

4. A method according to claim 1, which method also comprises:
   (a) maintaining the interior compartments of said electrodialysis stack substantially filled with at least one electrolytically conducting aqueous solution,
   (b) maintaining said counter-electrode compartment substantially full with electrolytically conducting aqueous solution, and
   (c) passing a substantially direct electric current between said counter-electrode and said area which is anodic during at least part of the operating time of stack thereby forming said electronically conducting, substantially anodically-refractory layer on said area.

5. Apparatus for extending the useful anodic life of an electrode in an electrodialysis stack which electrode comprises at least in part an area which is anodic during at least part of the operating time of said stack, said stack also comprising an electrode compartment containing said electrode, a counter-electrode in a counter-electrode compartment and interior compartments between said electrode compartment and said counter-electrode compartment, which apparatus comprises:
   (a) means for introducing into said electrode compartment a solution capable of forming on said area an electronically conducting layer which is substantially refractory anodically,
   (b) means for causing an electronically conducting, substantially anodically-refractory layer to be formed on said area, said layer being derived at least in part from said solution, and
   (c) means for removing from said electrode compartment solution depleted in capability of forming said layer.

6. The apparatus of claim 5 wherein means are provided for periodically reversing the electrical polarity between said electrode and counter-electrode.

7. The apparatus of claim 6 wherein means are provided for reversing said polarity in a symmetrical mode.

8. Apparatus for extending the useful anodic life of an electrode in an electrodialysis stack which electrode comprises at least in part an area which is substantially anodically-refractory and electronically-conducting and which is anodic during at least part of the operating time of said stack, said stack also comprising an electrode compartment containing said electrode, a counter-electrode in a counter-electrode compartment and interior compartments between said electrode compartment and said counter-electrode compartment, which apparatus comprises:
   (a) means for collecting a substantial portion of the corrosion products of said area, and
   (b) means for redepositing a substantial portion of said corrosion products on said area.

9. The apparatus of claim 8 wherein means are provided for periodically reversing the electrical polarity between said electrode and counter-electrode.

10. The apparatus of claim 9 wherein means are provided for reversing said polarity in a symmetrical mode.

11. An improved method of operating an electrodialysis apparatus, said apparatus comprising at least one electrodialysis pack which pack comprises first and second electrodes, interior electrodialysis compartments therebetween, said first electrode comprising a surface region having a composition adapted to convert ionic current to electronic current, said improved method comprising:
(a) contacting said first electrode in anode mode with an ionically conducting aqueous solution which in synergism with said surface region composition causes the current efficiency for the corrosion of said surface region to be less than about 10 percent;
(b) thereafter contacting said first electrode in situ in said electrodialysis pack with a liquid composition capable of substantially replacing the corrosion losses of said surface region; and
(c) causing said liquid composition to substantially replace the corrosion losses of said surface region.

12. The method of claim 11 in which said liquid composition is derived at least in part from the corrosion of an electrode in said apparatus.

13. An improved method of operating an electrodialysis apparatus, said apparatus comprising at least one electrodialysis pack which pack comprises first and second electrodes, interior electrodialysis compartments therebetween, said first electrode comprising at least in part an area which is anodic during at least part of the operating time of said apparatus, said improved method comprising:
(a) contacting said first electrode in situ in said pack with a liquid composition capable of depositing an anodically refractory, electronically conducting film on said area;
(b) causing said liquid composition to deposit said anodically-refractory film on said area; and
(c) thereafter removing said liquid from contact with said first electrode.

14. The method of claim 13 in which said liquid composition is derived at least in part from the corrosion of an electrode in said apparatus.

15. The method of claim 13 in which said liquid composition is caused to deposit said anodically-refractory film on said area by passing an ionic electric current between said area and said second electrode, and through said interior compartments.

16. The method of claim 13 in which said anodically-refractory film is derived at least in part from the corrosion of an electrode in said apparatus.

17. The method of claim 13 in which said anodically-refractory film comprises a metal.

18. The method of claim 13 in which said anodically-refractory film comprises a metal selected from the group consisting of lead, nickel, ruthenium, rhodium, palladium, iridium and platinum.

19. The method of claim 13 in which said first electrode comprises an electronic conductor selected from the group consisting of nickel, niobium, titanium, titanium alloys, tantalum, lead and lead alloys.

20. The method according to claim 13 wherein during the operating time of said stack, the electrical polarity of said electrode and counter-electrode is reversed at periodic intervals.

21. The method according to claim 20 wherein said periodic reversal is made in a symmetrical mode.

* * * * *